(12) United States Patent
Hosoya et al.

(10) Patent No.: US 7,839,562 B2
(45) Date of Patent: Nov. 23, 2010

(54) WHITE PARTICLES FOR IMAGE DISPLAY DEVICE

(75) Inventors: Yukio Hosoya, Tokyo (JP); Eiichi Sakai, Kanagawa (JP); Shigeki Takenouchi, Tokyo (JP); Tatsuya Nagase, Tokyo (JP); Okushi Okuyama, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 33 days.

(21) Appl. No.: 12/274,413

(22) Filed: Nov. 20, 2008

(65) Prior Publication Data

US 2009/0141337 A1    Jun. 4, 2009

(30) Foreign Application Priority Data

Nov. 30, 2007  (JP) .............................. 2007-310027

(51) Int. Cl.
*G02B 26/00*    (2006.01)
(52) U.S. Cl. ....................... 359/296; 359/290; 359/292
(58) Field of Classification Search ................. 359/290, 359/291, 292, 296, 298
See application file for complete search history.

(56) References Cited

U.S. PATENT DOCUMENTS 6,908,202 B2 *   6/2005   Graf et al. ...................... 362/26
7,525,719 B2 *   4/2009   Yakushiji et al. ............ 359/296

* cited by examiner

*Primary Examiner*—Ricky L Mack
*Assistant Examiner*—Brandi N Thomas
(74) *Attorney, Agent, or Firm*—Lucas & Mercanti, LLP (57) ABSTRACT

Disclosed are white particles for an image display device which includes: (i) a pair of substrates facing each other, provided that at least one of the substrates is transparent; and (ii) the white particles enclosed in a gap between the substrates, with which an image is displayed through migration of the white particles by generating an electric field between the substrates, wherein each of the white particles contains: (a) a core particles containing an inorganic oxide having a refractive index of 2.0 or more in an amount of 80 to 99 weight % based on the total weight of the core particle; and (b) a resin layer having a thickness of 10 to 1000 nm on a surface of the core particle.

13 Claims, 3 Drawing Sheets

FIG. 2 (a) BEFORE APPLICATION OF VOLTAGE

FIG. 2 (b) AFTER APPLICATION OF VOLTAGE

FIG. 3 (a) BEFORE APPLICATION OF VOLTAGE (SWITCH OFF)

FIG. 3 (b) AFTER APPLICATION OF VOLTAGE (SWITCH ON)

WHITE PARTICLES FOR IMAGE DISPLAY DEVICE

CROSS-REFERENCE TO RELATED APPLICATION

The present application is based on Japanese Patent Application No. 2007-310027 filed with Japan Patent Office on Nov. 30, 2007, the entire content of which is hereby incorporated by reference.

BACKGROUND OF THE INVENTION

1. Technical Field

The present invention relates to white particles used for an image display device wherein images are repeatedly displayed and deleted by allowing charged particles to migrate in an electric field.

2. Description of Related Art

Heretofore, as a display device substitutable for a liquid crystal display (LCD), new display devices employing technologies such as an electrophoretic method, an electrochromic method, a thermal method, and a dichroic-particles-rotary method have been proposed. Since these technologies have the advantages described below, the applications thereof to the next generation image display devices, such as a display element for use as a personal digital assistance, or an electronic paper, have received attention. That is, the advantages include: excellent image quality close to regular printed matter since a wider viewing angle can be attained compared to a liquid crystal display, lower electrical power consumption, and the so-called "memory performance", which is a characteristic of preserving images after the power is off.

Of these technologies, the image display technology employing the electrophoretic method is such that image display is achieved by disposing a solution comprising dispersed particles in a colored solution between a pair of substrates facing each other, followed by applying voltage of about several tens of volts between the substrates, to result in migration of particles in the liquid phase. As an image display technology employing the electrophoretic method, there have been proposed technologies such that a dispersed solution is contained in microcapsules, which are then disposed between a pair of substrates facing each other (for example, refer to Non-Patent Document 1). This technology is considered to be the most feasible for a practical application. However, it has the problem that maintaining a displayed image circumstances is hard to realize.

Specifically, the problem is the difference in the specific gravity between a colored solution and dispersed particles, that is, when the difference in specific gravity between them becomes excessive, the dispersed particles tend to sediment in the colored solution, resulting in a problem of achieving stable image display. For example, when dispersed particles of a high specific gravity, such as titanium oxide, are used in a colored solution of a low specific gravity, the dispersed particles sediment in the colored solution. Further, the colored solution is usually prepared using dyes which are considered to have drawbacks in preservation properties, so that within one aspect of this technology, it is difficult to maintain a constant level of quality of the displayed image.

On the other hand, an image display technology without use of solutions has been proposed. For example, there exists an image display technology in which charged particles are enclosed in a gas phase, and, by applying voltage, the aforesaid particles are allowed to migrate along a direction of an electric field. Although the aforesaid method had no problem such as sedimentation of particles or inferior preservation properties of colored solution, the aforesaid particles were required to be charged by applying voltage between substrates, and moreover, the charged particles were required to migrate along a direction of an electric field which was formed by the applied voltage. In other words, a technology has been desired which creates such a circumstance between substrates that, even under low applied voltage, particles can be smoothly charged and enabled to migrate. In order to respond to the demands, the so-called driving voltage reducing technology was studied, whereby particles are charged and allowed to migrate under low applied voltage, and then, a technology trying to achieve the reduced driving voltage by coating a fluororesin on the surfaces of substrates with which particles come into contact was studied (for example, refer to Patent Document 1).

Patent Document 1: Japanese Patent Application Publication (JP-A) 2003-248247

SUMMARY

However, the above-described technologies have a problem in a hiding power, and it was difficult to obtain a high contrast images.

In white particles employed in an image display device wherein an image is displayed by migration of charged particles, due to application of voltage, it is an object of the present invention to provide white particles, wherein the white particles exhibit a high hiding power which provides a high contrast image when an image is displayed, and an excellent electrostatic charge retention capability.

The present invention is achieved by taking the constitution described below.

White particles employed in an image display device wherein an image is displayed by enclosing particles between two substrates facing each other, provided that at least one of the electrodes is transparent, and by migrating the particles by generating electric filed between the above substrates, wherein the aforesaid white particles are provided with a resin layer of 10 to 1,000 nm in thickness on the surfaces of core particles incorporating an inorganic oxide compound exhibiting a refractive index of 2.0 or more in an amount of 80 to 99% by mass.

According to the present invention, in the white particles employed for an image display device wherein an image is displayed by migration, due to application of voltage, of charged particles, which are preferably enclosed in a gas phase, it is possible to provide the white particles exhibiting a high hiding power which provides a high contrast image when an image is displayed, and an excellent electrostatic charge retention capability.

DESCRIPTION OF THE PREFERRED EMBODIMENTS

The present invention relates to white particles employed in an image display device wherein an image is displayed by migration, due to application of voltage, of charged particles, and in particular, relates to white particles wherein a high contrast image is stably provided when an image is displayed.

To stably obtain a high contrast image when an image is displayed, it is necessary to employ white particles and black particles, both of which exhibit a high hiding power, and an excellent electrostatic charge retention capability.

However, the present state is that, though the black particles which exhibit a high hiding power and an excellent electrostatic charge retention capability are readily obtained, the white particles which exhibit a high hiding power and an excellent electrostatic charge retention capability have not been obtained.

The inventors of the present invention studied on the white particles which exhibit a high hiding power and an excellent electrostatic charge retention capability (hereinafter also referred to as an electrostatic charge retention rate).

As a result of the various studies, it was found that the white particles exhibiting a high hiding power and an excellent electrostatic charge retention capability were obtained by providing a thin film resin layer on a surface of a core particle incorporating a large quantity of an inorganic oxide exhibiting a high refractive index, and when an image was displayed by employing the above white particles for the above-described image forming apparatus, a high contrast image was obtained. To provide a sufficient hiding power, the particles are required to incorporate an inorganic oxide exhibiting a refractive index of 2.0 or more in an amount of 80% or more by mass, but when the amount thereof exceeds 99% by mass, the particles can not be formed. Further, to satisfy the electrostatic charge retention capability, a resin layer thickness of 10 to 1,000 nm is required to be provided on the surface of the core particle, but when the resin layer thickness is lower than 10 nm, the electrostatic charge retention capability is insufficient, and on the contrary, when the thickness exceeds 1,000 nm, coagulation of the particles occurs during the production. Therefore, it was found that, by incorporating an inorganic oxide exhibiting a refractive index of 2.0 or more in an amount of from 80% to 99% by mass, the white particles secured a sufficient whiteness, and by providing a resin layer of 10 to 1,000 nm in thickness on the surface of the core particle, the white particles exhibited the electrostatic charge retention capability, while exhibiting a hiding power, and further, exhibited prevention of the coagulation of the particles.

The present invention will be explained in detail. The image display device of the present invention is usually also referred to as a display device.

The white particles of the present invention are preferably employed as particles for a powder display which switches displays by migrating particles in a gas phase, but are not limited to the above usage. The white particles of the present invention is provided with a resin layer of from 10 to 1,000 nm, preferably from 20 to 50 nm in thickness on the surface of the core particle incorporating an inorganic oxide exhibiting a refractive index of 2.0 or more in an amount of from 80% to 99% by mass, preferably from 85% to 90% by mass. The refractive index of the white particles is more preferably from 2.1 to 4.0, and still more preferably from 2.4 to 2.8.

The term "refractive index" of the present invention refers to an absolute refractive index with the refractive index of a vacuum being 1.0.

[Measuring Method of Refractive Index of Inorganic Oxide]

In the present invention, the refractive index of a particle is determined via an immersion method. That is, mixed solvents exhibiting various refractive indices are prepared by combining solvents exhibiting different refractive indices (toluene, 1-bromonaphthalene, 1-chrolonaphthalene, diiodomethane, or diiodomethane including sulfur), and in each solvent the targeted particle is dispersed. The refractive index of the targeted particle is the refractive index of the most transparent solvent at 25° C. among the above prepared various solvents in which the particle is dispersed. The refractive index of the solvent is determined at 25° C. using an Abbe Refractometer Type 4, made by Atago Co., Ltd.

[Measuring Method of Layer Thickness of Resin Layer]

The layer thickness of the resin layer is measured using a photograph of a cross-section of a white particle taken by a transmission electron microscope (JEM-2000FX: JEOL Ltd.). Specifically, the white particle is sufficiently dispersed into a normal temperature curable epoxy resin, and then embedded, which is then dispersed into styrene particulates of about 100 nm in particle size, followed by being pressure formed. The block thus prepared is, if necessary, subjected to dyeing using triruthenium tetroxide, and then the resulting block is cut into a thin section sample by means of a microtome equipped with diamond knives. The thin section is then photographed at a magnification of 1,000 using a transmission electron microscope with the cross-section of one white particle being within a microscope field of view. Next, using the photograph taken above, the boundary between a core particle and a resin layer is defined visually. After that, straight lines are drawn on the photograph from a center of gravity of the white particle to the surface of the white particle at 45 degrees intervals, and then eight distances between a point A and a point B are measured, wherein the point A is a point where each line contacts with the core particle surface, and the point B is a point where each line contacts with the resin layer surface, and the maximum value of the measured distances is taken as the film thickness of the resin layer of the white particle. The film thickness of the resin layer of the white particle of the present invention is an arithmetic mean value of 100 film thicknesses of a resin layer of white particles which are randomly selected.

The inorganic oxides exhibiting a refractive index of 2.0 or more include titanium oxide, zinc oxide, strontium titanate, and barium titanate. Of these, titanium oxide is preferred.

The preparation method of the core particle, incorporating an inorganic oxide in a large amount of 80 to 99% by mass, is not particularly limited, and includes, for example, a method in which inorganic oxide particulates are dispersed in a polymerizable monomer, and then polymerized after granulation to prepare the core particles, a method in which inorganic oxide particulates are dispersed in a resin solution, and then spray-dried to prepare the core particles, and a method in which an inorganic oxide and a resin are subjected to melt kneading, and then pulverized to prepare the core particles. Of these, a method employing a polymerizable monomer is preferable in a case where the core particle incorporating a large amount of an inorganic oxide are prepared.

Examples of a resin material used for forming a core particle by binding an inorganic oxide thereto include as follows: polyester resins represented by polyethylene terephthalate or polyethylene naphthalate, polycarbonate resins, polyether sulfone resins, and polyimide resins. In addition, other examples include transparent resins provided by radical polymerization of polymerizable vinyl monomers such as acrylic resins and polyethylene resins, which are polymers of acrylic esters or methacrylate esters, represented by polymethylmethacrylate (PMMA).

A volume-based median size ($D_{50}$) of the formed core particle is preferably 3 to 15 μm.

A resin employed as a resin layer provided on a surface of the core particle is not particularly limited as long as the resin exhibits an excellent adhesiveness with the core particle and satisfies an electrostatic charge retention rate, and includes an acrylic resin, and a solvent-soluble polyester.

A method to provide the resin layer on the surface of the core particle is not particularly limited, and a specific method includes a method in which a resin solution dissolved in a solvent is sprayed on the surface of the core particle.

A shape of the white particle is preferably spherical or nearly spherical.

The image display device of the present invention is one in which white particles and black particles are enclosed between two substrates facing each other, provided that at least one of the electrodes is transparent.

Next, specific embodiments of the image display device of the present invention will be described.

Representative structural cross-sections of the image display of the present invention are shown in FIGS. 1(a) and 1(b).

FIG. 1(a) shows that layer-structured electrodes 15 are provided on substrates 11 and 12, and insulating layers are provided on the surfaces of the electrodes 15. Alternatively, the image display device as shown in FIG. 1(b) has a structure in which no electrode is provided in the device, and is designed so that an electric field is applied through electrodes which are provided in the exterior of the device to enable particles to migrate. Image display device 1 of FIGS. 1(a) and 1(b) have an image display surface 18a. Image display device 1 of FIGS. 1(a) and 1(b) is, as shown in the figure, designed so that an image is viewed from substrate 11, but the present invention is not limited to a structure in which an image is viewed from substrate 11. The type of image display device as shown in FIG. 1(b) exhibits the advantage that electrode 15 is not provided in the device itself, so the structure of the device can be simplified and the manufacturing steps reduced. FIGS. 3(a) and (b) show that the type of image display device 1, as shown in FIG. 1(b), is configured to enable voltage to be applied by setting it in a device capable of applying the aforesaid voltage. The cross-sectional structure of the image display device of the present invention is not limited to those shown in FIGS. 1(a) and 1(b).

At the outermost part of image display device 1 of FIG. 1(a), there are provided two substrates 11 and 12 facing each other, which are parts of the housing constituting the aforesaid image display device. On each surface of both surfaces facing each other of substrates 11 and 12, electrode 15 is provided to apply voltage. Further, on each electrode 15, there is provided insulating layer 16, which incorporates a substance of a silicone structure.

Electrode 15 and insulating layer 16 are provided on substrates 11 and 12, and there exist particles in gap 18 which is formed by the two sides facing each other incorporating electrode 15 and insulating layer 16. In image display device 1 of FIGS. 1(a) and 1(b), there exist two types of particles as particles namely black particles 21 and white particles 22. Further, image display device 1 of FIGS. 1(a) and 1(b) has a structure such that gap 18 is surrounded by substrates 11 and 12 and two walls 17 on four sides, whereby particles exist within gap 18 in an enclosed state.

The size of gap 18 is not limited as long as it is within a range in which the enclosed particles are capable of migration and an image contrast can be maintained, which normally is 10-500 μm, preferably 10-200 μm, and more preferably 25-75 μm. The volume occupancy of particles in gap 18 is 5-70%, preferably 10-60%, and more preferably 20-40%. By setting the volume occupancy of particles within the above range, particles can smoothly migrate within gap 18, and an image of excellent contrast can be produced.

Next, behavior of particles in gap 18 of image display device 1 will be described.

The image display device of the present invention is composed of particles existing between two substrates facing each other and at least one of the surfaces of the two substrates facing each other which incorporate a substance of a silicone structure, whereby an image display is achieved by particles which are housed between the two electrodes. That is, a substance of a silicone structure is incorporated in at least one of the surfaces of two substrates constituting the image display device, and when voltage is applied between the aforesaid two substrates to form an electric field, the aforesaid particles existing between the aforesaid two substrates are electrified and migrate along the direction of the electric field. Thus, an image display is achieved by migration of charged particles between substrates via application of voltage between the substrates where particles are present.

The image display by the image display device of the present invention is achieved through the following steps:

(1) Particles used for a display medium are electrically charged via commonly known methods such as triboelectric charging using carriers;

(2) The aforesaid charged particles are enclosed between two electrodes facing each other, and voltage is applied between the aforesaid electrodes;

(3) An electric field is formed between the substrates via application of voltage to them;

(4) Being drawn, along the electric field, toward surfaces of the substrates via Coulomb attraction, the charged particles migrate, whereby an image display can be achieved; and, (5) The migration direction of the charged particles can be changed by changing the electric field direction between the substrates. The image display can be variously changed by the changes of the migration direction of the charged particles.

The above-described commonly known electrical charging methods of particles include, for example, a method in which particles are electrically charged through triboelectric charging through contact with carriers, and a method in which two types of particles differing in charging characteristic are mixed and stirred with a shaker to electrically charge the aforesaid particles through triboelectric charging among the aforesaid particles.

Figure 2:
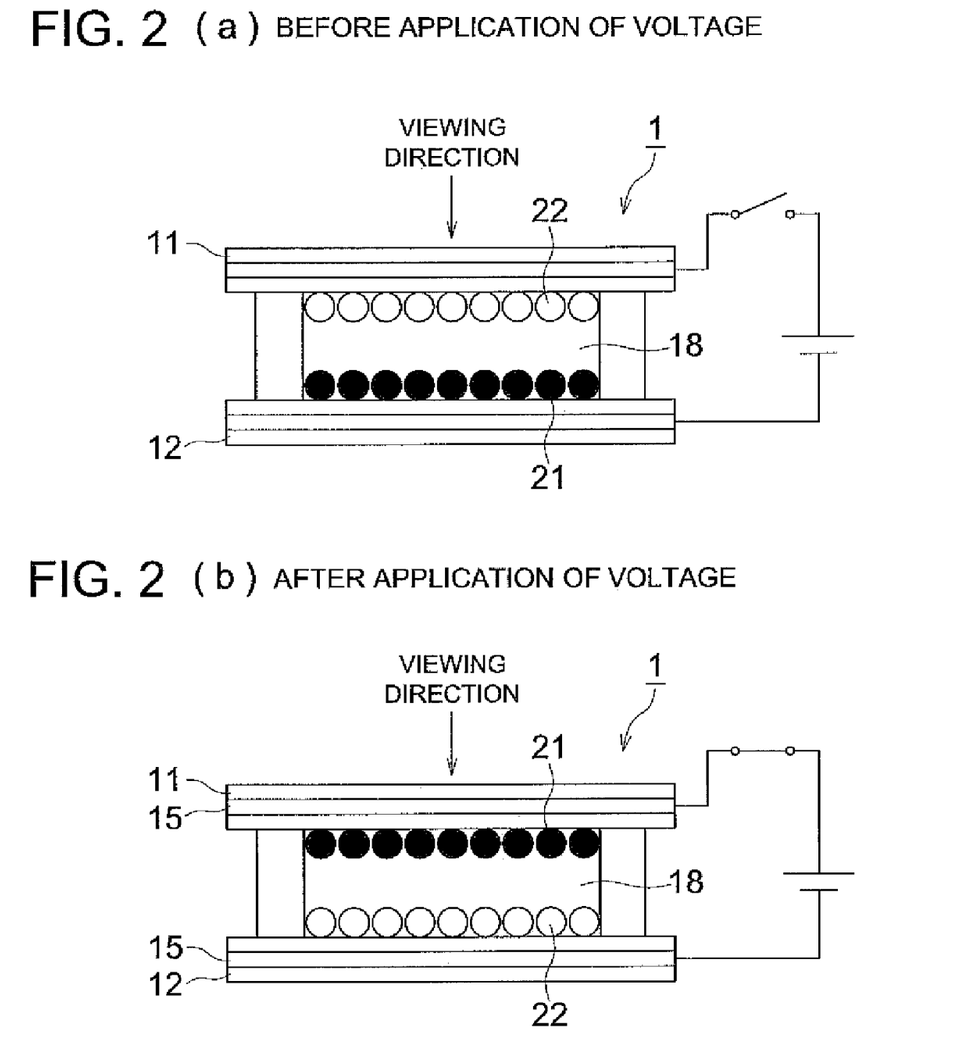
FIGS. 2(a) and 2(b) are schematic depictions showing an example of a particle migration by application of voltage between substrates.

Examples of migration of particles, in response to application of voltage between substrates, are shown in FIGS. 2(a), 2(b).

Another examples of migration of particles, in response to application of voltage between substrates, are shown in FIGS. 3(a), 3(b).

FIG. 2(a) shows a state of particles before application of voltage between substrates 11 and 12, and positively charged white particles 22 exist near substrate 11, which is provided on the viewing side. This state indicates that image display device 1 displays a totally white image. Further, FIG. 2(b) shows a state of particles after application of voltage to electrode 15, and shows that negatively charged black particles 21 migrated near substrate 11 which is provided on the viewing side, and white particles 22 migrated to the side of substrate 12. This state indicates that image display device 1 displays a totally black image.

Figure 3:
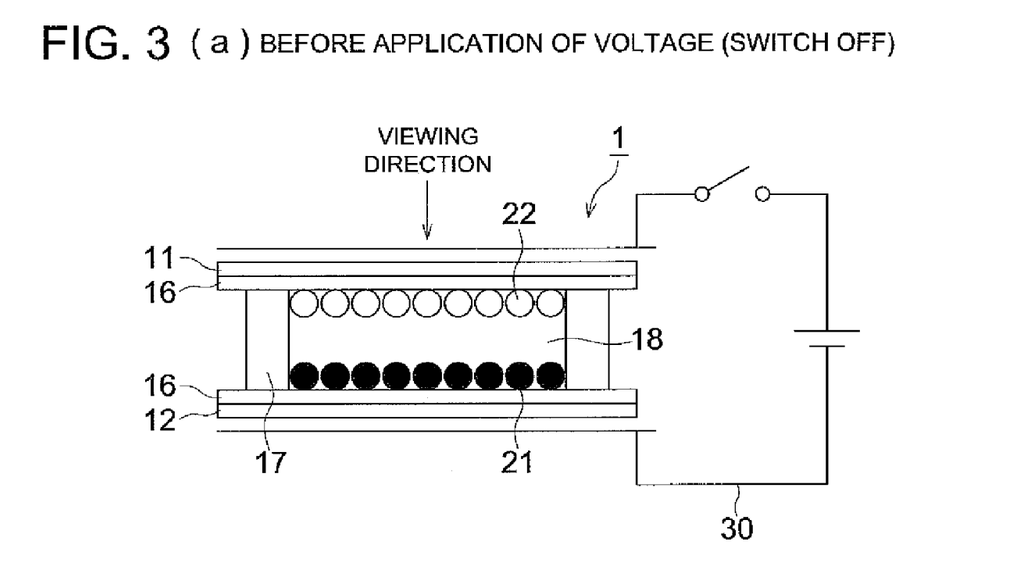
FIGS. 3(a) and 3(b) are schematic depictions showing another example of a particle migration by application of voltage between substrates.

FIGS. 3(*a*) and (*b*) show states of particles before and after voltage being applied respectively, where a type of image display device 1 having no electrodes therein is connected to voltage application apparatus 30. In the type of image display device 1 as shown in FIG. 1(*b*), similarly to image display device 1 having electrodes 15, black particles 21, which are negatively charged by application of voltage, have migrated to the vicinity of substrate 11 which is provided on the viewing side, and white particles 22, which are positively charged, have migrated to the side of substrate 12.

Figure 1:
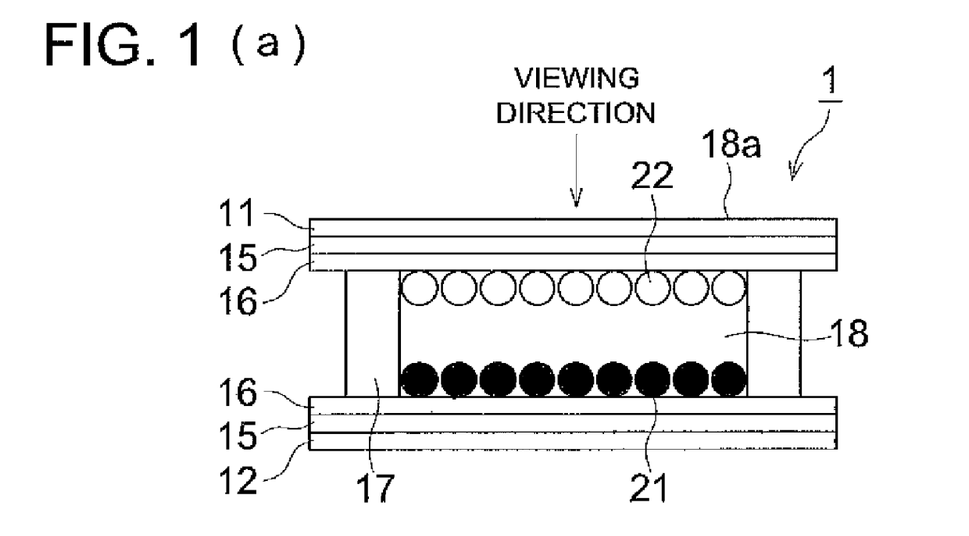
FIGS. 1(a) and 1(b) are schematic drawings showing an example of the cross-sectional constitution of an image display device.

Subsequently, there will be explained substrates 11 and 12, electrodes 15, insulating layers 16, dividing walls 17, and particles (being black particles 21 and white particles 22), which constitute image display device 1 as shown in FIGS. 1(*a*) and 1(*b*).

First, substrates 11 and 12 constituting image display device 1 will be explained with regard to image display device 1 since the observer views images formed of particles from at least one side of substrates 11 and 12, a transparent material is required for the substrate which is provided on the viewing side. Therefore, the substrate used on the side from which the observer views images is, for example, preferably composed of a light transparent material exhibiting visual light transmittance of not less than 80%. An observer can clearly view images through a substrate exhibiting a visual light transmittance of not less than 80%. Of substrates constituting image display device 1, the substrate which is provided on the opposite side of the image viewing side need not necessarily be composed of a transparent material.

The thickness of substrates 11 and 12 is preferably of 2 μm-5 mm, more preferably of 5 μm-2 mm, and still more preferably 30-200 μm. A thickness of substrates 11 and 12 within the above range provides image display device 1 sufficient rigidity, as well as enabling and maintaining uniform spacing between the two substrates. Further, since a thickness of the substrates within the above range provides a compact size and low weight image display device, usage of the aforesaid image display device in a wide variety fields is promoted. Further, by setting the thickness of the substrate on the image viewing side to be within the above range, correct viewing of displayed images can be achieved, to result in no hindrance of display quality.

Next, electrodes 15 constituting image display device 1 will be explained. Electrodes 15, which are provided on one surface of substrates 11 and 12, form an electric field by application of voltage between the electrodes, that is, within gap 18. Similarly to the above-mentioned substrates, transparent electrodes 15 are required to be provided on the side from which the observer views the image.

The thickness of the electrode which is provided on the image viewing side is required to be of such a level that visual light transparency is not hindered, and at the same time, electrical conductivity is ensured. Specifically, the aforesaid thickness is preferably 3 nm-1 μm, more preferably 5-400 nm. Visual light transmittance of the electrode which is provided on the image viewing side is, similarly to the aforesaid substrate, preferably not less than 80%.

It is preferable that the thickness of the electrode which is provided on the opposite side of the image viewing side is also within the above-described range, but that electrode is not required to be transparent.

Materials constituting electrodes 15 include metal materials, electroconductive metal oxides, and electroconductive polymer materials. Specific metal materials include, for example, aluminum, silver, nickel, copper, and gold. Specific electroconductive metal oxides include indium tin oxides (ITO), indium oxide, antimony tin oxides (ATO), tin oxide, and zinc oxide. Examples of electroconductive polymer materials include polyaniline, polypyrrole, polythiophene, and polyacetylene.

Methods of forming electrodes 15 on substrates 11 and 12 include, in the case of forming a thin film electrode, for example, a spattering method, a vacuum deposition method, a chemical vapor deposition method (the CDV method), and a coating method. Further included is a method in which an electroconductive material is mixed with a solvent or binder resin, and the resulting mixture is coated on a substrate to form the electrode.

As shown in FIGS. 1(*a*) and 1(*b*), image display device 1 of the present invention has a structure such that insulating layer 16, incorporating a substance of a silicone structure, is provided on one surface of electrode 15, and particles 21 and 22 make contact with the surface of insulating layer 16.

The thickness of insulating layer 16 is preferably not less than 0.01 μm and not more than 10.0 μm. That is, in the case of the thickness of insulating layer 16 being within the above range, particles 21 and 22 can migrate without high application of voltage between the two electrodes 15, and then it is preferable that, for example, image formation can be carried out at the voltage level being applied for an image formation by an electrophoretic method.

When images are displayed with two types of colored particles, namely white particles 22 and black particles 21, migration of the two types of particles can be controlled by providing white particles 22 and black particles 21 with differing electrical characteristics via commonly known methods. Specific examples of the aforesaid methods include, for example, a method to design particles so as to change their relative position in the triboelectric series compared to carriers, and a method to select an external additives, which are added to surfaces of particles, so that the aforesaid particles may change the relative position in the triboelectric series compared to carriers.

The particle size of particles which is usable for image display device 1 is preferably 0.1-50 μm with respect to the volume-based median diameter. Setting the particle size of particles within the above range provides uniform and clear images. Further, since there is no need to be concerned that the above particles cause mutual coagulation, the particles can migrate smoothly and provide images exhibiting moderate image density and contrast.

The volume-based median diameter ($D50_v$) of particles is measured and calculated via an apparatus, such as Multisizer III (manufactured by Beckman Coulter Inc.) connected with a computer system for data processing.

The aforesaid measurement is carried out as follows: 0.02 g of particles is soaked in 20 ml of a surface active agent solution, which is employed to disperse particles and is prepared, for example, by diluting a neutral detergent containing a component of surface active agent by a factor of 10 in pure water, and the resulting mixture is subjected to ultrasonic dispersion for one minute to prepare the particle dispersion. The particle dispersion is then charged using a pipette into a beaker containing ISOTON II (produced by Beckman Coulter Inc.), placed on a sample stand, to achieve a measured concentration of 10%, followed by measurement with the count of the measuring apparatus set to 2,500. The aperture diameter of Multisizer III is set to 50 μm.

Next, materials constituting white particles and black particles which are enclosed within gap 18, formed of substrates 11 and 12, will now be explained. The white particles employed in image display device 1 are white particles of the present invention. And the black particles will be described later. They are required to exhibit electrical charge characteristics by an action such as frictional force. Further, inorganic compound particles such as titanium oxide, or calcium carbonate may be externally added onto the surface of the white particles and the black particles.

The production methods of black particles are not particularly limited, and black particles can be produced by application of commonly known methods for production of particles incorporating a resin and a coloring agent. Commonly known methods include, for example, a method of a toner employed for electrophotographic image formation. Specific production methods of black particles include, for example, the following:

(1) A method in which a resin and a coloring agent are kneaded to form a mixture, which mixture is then subjected to the steps of pulverization and classification to produce the targeted particles.

(2) A so-called suspension polymerization method, in which a polymerizable monomer and a coloring agent are mechanically agitated in a water-based medium to form droplets, which are then subjected to polymerization to produce the targeted particles.

(3) A so-called emulsion coagulation method, in which a polymerizable monomer is dropped into a water-based medium containing a surface active agent, which is then polymerized in micelles to produce the targeted polymerized particles of 100-150 nm, and after which, coloring agent particles and an aggregating agent are added to the aforesaid polymerized particles followed by coalescing the aforesaid polymerized particles and the aforesaid coloring agent particles.

Next, the coloring agent used for black particles is not particularly limited, and commonly known pigments are usable. Black pigments constituting black particles include, for example, carbon black, copper oxide, manganese dioxide, aniline black, and activated carbon, of which carbon black is preferred.

EXAMPLES

The embodiments of the present invention will be described with reference to examples, but the invention is not limited to them.

<<Preparation of White Particles>>
<Preparation of White Particle 1>
(Preparation of Core Particle 1)

In a four-neck flask, 42 parts by mass of phenol, 64 parts by mass of 37% formalin solution, 267 parts by mass of anatase-type titanium dioxide (TA-200: produced by Fuji Titanium Industry Co., Ltd.), 1.0 pat by mass of calcium fluoride, 13 parts by mass of 28% aqueous ammonia water, and 40 parts by mass of water were blended while stirring to be granulated. After that, the temperature of the resulting mixture was raised to 85° C. at a raising rate of 17° C./min., and reacted to harden for 180 minutes while maintaining the temperature, to prepare a spherical particle of 15 μm in size.

The above solution containing the particles was cooled down to 30° C., and then 500 parts of water was added. After that, the supernatant solution was removed, and the resulting compound was air dried after being rinsed with water. Subsequently, the resulting compound was dried under reduced pressure to prepare "Core Particle 1".

(Preparation of Resin Layer)

"Resin Solution 1" in which 5 parts by mass of acrylic resin (S-3103: produced by Toagosei Co., Ltd.) was dissolved into 100 parts by mass of toluene was prepared.

Employing a spray-coat apparatus, Resin Solution 1 was sprayed on the surface of Core Particle 1 to form a resin coat to 20 nm in thickness, and then dried at 40° C. for 2 hours to prepare white particles. The film thickness of the resin coat was determined via a transmission electron microscope The determination was carried out in the manner that the thickness was measured using a photo of a cross-section of a particle taken by a transmission electron microscope (JEM-2000FX: JEOL Ltd.), and the measured value was an average of maximum film thickness of randomly selected 100 particles.

To the white particles thus prepared, 0.6 parts by mass of silica particulates (a number-average primary particle size of 50 nm), which were treated with an aminosilane coupling agent, were added, and then the mixture was treated for 10 minutes using a hybridizer (produced by NARA MACHINERY CO., LTD.) in which the rotation rate was set to 15,000 rpm. Subsequently, to the above mixture, 1.0 part by mass of silica particles which were subjected to an aminosilane coupling agent treatment and exhibit a number-average primary particle size of 15 nm was added, and then the similar treatment to the above was carried out, to prepare "White Particle 1".

<Preparation of White Particle 2>

"White Particle 2" was prepared in the similar manner to the preparation of white Particle 1, except that the anatase-type titanium dioxide was changed to a zinc oxide.

<Preparation of White Particle 3>

"White Particle 3" was prepared in the similar manner to the preparation of White particle 1, except that the anatase-type titanium dioxide was changed to a magnesium oxide.

<Preparation of White Particles 4 to 6>

"White Particles 4 to 6" were prepared in the similar manner to the preparation of White Particle 1, except that the percent by mass of the anatase-type titanium dioxide was changed to those given in Table 1.

<Preparation of White Particles 7 to 10>

"White Particles 7 to 10" were prepared in the similar manner to the preparation of White Particle 1, except that the thickness of the resin layer was changed to those given in Table 1.

The items such as an inorganic oxide, content, film thickness of the resin employed in the preparation of the white particles are described in Table 1

<Preparation of White Particle 11>

"White Particle 11" was prepared in the similar manner to the preparation of White Particle 1, except that the resin layer is not provided.

<Preparation of White Particle 12>

Preparation of "White Particle 12" was tried by changing the content of titanium oxide used in the preparation of Core Particle 1 from 90% by mass to 99.2% by mass. However, the preparation of the particle was unsuccessful.

The items such as an inorganic oxide, content, film thickness of the resin employed in the preparation of the white particles are described in Table 1.

TABLE 1

| White particle No. | Core particle | | | Resin layer | | Particle size[2] (μm) |
|---|---|---|---|---|---|---|
| | Material | Refractive index | content (% by mass) | Resin | Film thickness (nm) | |
| 1 | Titanium oxide | 2.52 | 90 | Acrylic resin | 20 | 15 |
| 2 | Zinc oxide | 2.00 | 90 | Acrylic resin | 20 | 15 |
| 3 | Magnesium oxide | 1.75 | 90 | Acrylic resin | 20 | 15 |
| 4 | Titanium oxide | 2.52 | 80 | Acrylic resin | 20 | 15 |
| 5 | Titanium oxide | 2.52 | 99 | Acrylic resin | 20 | 15 |
| 6 | Titanium oxide | 2.52 | 75 | Acrylic resin | 20 | 15 |
| 7 | Titanium oxide | 2.52 | 90 | Acrylic resin | 10 | 15 |
| 8 | Titanium oxide | 2.52 | 90 | Acrylic resin | 1000 | 15 |
| 9 | Titanium oxide | 2.52 | 90 | Acrylic resin | 7 | 15 |
| 10 | Titanium oxide | 2.52 | 90 | Acrylic resin | 1100 | 15 |
| 11 | Titanium oxide | 2.52 | 90 | Acrylic resin | 0 | 15 |
| 12[1] | Titanium oxide | — | 99.2 | — | | |

Notes:
[1] No particle was prepared.
[2] A volume-based median size ($D_{50}$)

<<Preparation of Black Particle>>

Preparation of "Black Particle 1"

The resin and the carbon black described below were introduced into a Henschel mixer (manufactured by Mitsui Miike Machinery Co., Ltd.), and was subjected to a blending treatment over 5 minutes at a circumferential speed of the mixing blades being set to 25 m/second to produce a mixture.

| | |
|---|---|
| Styrene acrylic resin (at weight average molecular weight of 20,000) | 100 parts by mass |
| Carbon black (at a number-average primary particle size of 25 nm) | 10 parts by mass |

The above mixture was kneaded via a biaxial extrusion kneading machine, after which the kneaded mixture was coarsely pulverized via a hammer mill, and then the resulting coarsely pulverized mixture was pulverized via a turbo-mill pulverizer (manufactured by Turbo Kyogyo Co., Ltd.). After that, the resulting fine particles were subjected to classification treatment via an air classifying machine utilizing the Coanda effect, to produce black particles with a volume-based median size of 8.0 μm.

Next, to the above black particles, 0.6 parts by mass of fine silica particles (a number-average primary particle size of 50 nm), which were treated with a dichlorosilane coupling agent, were added, and then the mixture was treated with a hybridizer (manufactured by Nara Machinery Co., Ltd.) at a rotation rate of 15,000 rpm for 10 minutes. Subsequently, to the above mixture, 1.0 part by mass of silica particles with a number-average primary particle size of 15 nm which were treated with a dichlorosilane coupling agent was added, and then a treatment similar to the above was carried out, to prepare "Black Particle 1".

<<Preparation of Triboelectrically Charged Particle>>

50% by mass of "White Particle 1" and 50% by mass of "Black Particle 1", both of which were prepared above, were stirred with a shaker for 30 minutes so that both particles were triboelectrically charged in advanced, to prepare "Triboelectrically Charged Particles" where white particles were positively charged and black particles were negatively charged.

<<Preparation of Image Display Device>>

A gap was formed in such a manner that the two glass substrates, having an insulating layer composed of a polycarbonate resin and a dimethylsilicone resin, were arranged so that the insulating layers faced each other, and two 50 μm boards of polyethylene terephthalate serving as dividing walls were sandwiched between the aforesaid glass substrates at the both ends, to prepare an "Image Display Device" having the cross-sectional constitution as shown in FIG. 1(a).

"Triboelectrically Charged Particles" prepared above were made to fill the aforesaid gap to 15% of each occupied volume of white particles and black particles, to prepare "Image Display Device".

Display characteristics of image display device were evaluated in such a manner that direct-current voltage was applied to the device via the following steps, and reflection density of the image display device, whose density was provided by the applied voltage, was determined. The application of voltage was carried out via the steps described below so that hysteresis loops would be drawn exhibiting paths such that applied voltage was varied from 0 V to the plus voltage region, followed by dropping into the minus voltage region, and after that, applied voltage was returned again to 0 V. That is; (1) application of voltage by varying voltage from 0 V to +100 V at intervals of 20 V; (2) application of voltage by varying voltage from +100 V to 100 V at intervals of 20 V; and (3) application of voltage by varying voltage from −100 V to 0 V at intervals of 20 V.

Direct-current voltage was applied to "Image Display Device" employing two electrodes having a thin film of indium tin oxides (ITO) which were provided to the image display device.

When direct-current voltage was applied to each image display device as in the above-described steps, it was confirmed that the display changed from white to black following application of positive voltage at a state of white display.

Evaluation was conducted for display characteristics such as black density, white density, and contrast, and also an electrostatic charge retention capability (rate)

(Black Density)

The term "black density" refers to reflection density on the display surface which density is provided when voltage of +100 V is applied to the electrode located on the viewing side of the image display device.

(White Density)

The term "white density" refers to reflection density on the display surface which density is provided when voltage of −100 V is applied.

(Contrast)

Contrast is defined by the difference between black density and white density. That is, it is defined by equation:

Contrast=black density−white density

Each above-mentioned density is an average density of 5 densities randomly measured at 5 points on the display surface via a reflection densitometer (RD-918: manufactured by Macbeth Co.).

A white density of 0.45 or less, a black density of 1.35 or more, and a contrast of 0.9 or more, were evaluated as acceptable.

(Electrostatic Charge Retention Capability (Rate))

Electrostatic charge retention rate was determined via the formula below.

4 parts by mass of the above prepared white particles and 100 parts by mass of carriers coated with acrylic fluoride resin employed for the electrophotographic process of a two-component developing system were stirred using a stirrer at normal temperature and humidity (20° C. and 50% RH) for 30 hours.

After stirring, the electrified amount of the white particles was measured via a blow-off powder electrified amount measuring apparatus (TB-2000: manufactured by Toshiba Chemical Co., Ltd) was employed. The electrified amount thus obtained is donated as "an electrified amount right after being electrified".

Subsequently, the white particles were left to stand at 40° C. and 80% RH for 48 hours, and then the electrified amount of the white particles was measured without stirring. The electrified amount thus obtained is donated as "a electrified amount after being left to stand".

Electrostatic charge retention rate is determined via the formula below.

Electrostatic charge retention rate="an electrified amount after being left to stand"/"an electrified amount right after being electrified"×100

Electrostatic charge retention rate of 60% or more is accepted. An acceptable retention rate is marked as "A", while an unacceptable retention rate is marked as "U".

The evaluation results are shown in Table 2.

TABLE 2

| | White particle No. | Display characteristics | | | | Electrostatic charge retention capability (%) |
|---|---|---|---|---|---|---|
| | | White density | Black density | Contrast | Note | |
| Present invention 1 | 1 | 0.38 | 1.45 | 1.07 | — | 72% (A) |
| Present invention 2 | 2 | 0.41 | 1.42 | 1.01 | — | 75% (A) |
| Present invention 3 | 4 | 0.42 | 1.44 | 1.02 | — | 80% (A) |
| Present invention 4 | 5 | 0.31 | 1.46 | 1.15 | — | 65% (A) |
| Present invention 5 | 7 | 0.37 | 1.43 | 1.06 | — | 61% (A) |
| Present invention 6 | 8 | 0.45 | 1.43 | 0.98 | — | 92% (A) |
| Comparative example 1 | 3 | 0.68 | 1.43 | 0.75 | — | 76% (A) |
| Comparative example 2 | 6 | 0.58 | 1.41 | 0.83 | — | 86% (A) |
| Comparative example 3 | 9 | 0.40 | 1.46 | 1.06 | — | 49% (U) |
| Comparative example 4 | 10 | 0.78 | 1.23 | 0.45 | *1 | 95% (A) |
| Comparative example 5 | 11 | 0.41 | 1.43 | 1.02 | — | 21% (U) |

*1: Coagulation of black and white particles occurred

As shown in Table 2, each image formed by employing "White Particles 1, 2, 4, 5, 7, and 8" of Example 1 to 6 of the present invention exhibits values of display characteristics such that black density is 1.35 or more, white density is 0.45 or less, and contrast is 0.9 or more, and also exhibits electrostatic charge retention capability of 60% or more, to result in reaching targeted standards prescribed for the present invention.

On the other hand, each image formed by employing "White Particles 3, 6, 9, and 10" of Comparative Example 1-4, which is outside the scope of the present invention, did not reach at least one of the targeted standards of display characteristics prescribed for the present invention.

What is claimed is:

1. White particles for an image display device which comprises
    (i) a pair of substrates facing each other, provided that at least one of the substrates is transparent; and
    (ii) the white particles enclosed in a gap between the substrates,
    with which an image is displayed through migration of the white particles by generating an electric field between the substrates,
    each of the white particles comprising:
    (a) a core particle containing an inorganic oxide having a refractive index of 2.0 or more in an amount of 80 to 99 weight % based on the total weight of the core particle; and
    (b) a resin layer having a thickness of 10 to 1000 nm on a surface of the core particle.

2. The white particles of claim 1,
    wherein the inorganic oxide has a refractive index of 2.4 to 2.8.

3. The white particles of claim 1,
    wherein the inorganic oxide is at least one selected from the group consisting of titanium oxide, zinc oxide, strontium titanate and barium titanate.

4. The white particles of claim 1,
    wherein the inorganic oxide is titanium oxide.

5. The white particles of claim 1,
    wherein the core particle further comprises a resin for binding the inorganic oxide, provided that the resin is selected from the group consisting of an polyester resin, a polycarbonate resin, a polyether sulfone resin, a polyimide resin, an acrylic resin and a polyethylene resin.

6. The white particles of claim 1,
    wherein the core particle has a volume-based median size ($D_{50}$) of 3 to 15 μm.

7. The white particles of claim 1,
    wherein the resin layer comprises an acrylic resin or a solvent-soluble polyester resin.

8. The white particles of claim 1,
    wherein the resin layer has a thickness of 20 to 50 nm.

9. The white particles of claim 1,
    wherein the white particle is spherical.

10. An image display device comprising:
    (i) a pair of substrates facing each other, provided that at least one of the substrates is transparent; and
    (ii) the white particles of claim 1 and black particles both of which being enclosed in a gap between the substrates,
    wherein an image is displayed through migration of the white particles and black particles by generating an electric field between the substrates.

11. The image display device of claim 10,
    wherein the gap between the substrates is 10 to 500 μm.

12. The image display device of claim 10,
    wherein the white particles are positively charged and the black particles are negatively charged.

13. The image display device of claim 10,
    wherein a volume occupancy of the white and black particles in the gap between the substrates is from 5 to 70% based on the total volume of the gap.

* * * * *